(12) United States Patent
Ryan et al.

(10) Patent No.: US 6,990,600 B2
(45) Date of Patent: Jan. 24, 2006

(54) METHOD FOR CHECKING A COMPUTER SYSTEM CONFIGURATION

(75) Inventors: Fintan Ryan, Dublin (IE); John Ward, Dublin (IE)

(73) Assignee: Sun Microsystems, Inc., Santa Clara, CA (US)

(*) Notice: Subject to any disclaimer, the term of this patent is extended or adjusted under 35 U.S.C. 154(b) by 372 days.

(21) Appl. No.: 10/235,991

(22) Filed: Sep. 5, 2002

(65) Prior Publication Data
US 2003/0126504 A1 Jul. 3, 2003

(30) Foreign Application Priority Data
Sep. 6, 2001 (GB) .................................. 0121586

(51) Int. Cl.
*G06F 11/00* (2006.01)
(52) U.S. Cl. .............................. 714/3; 714/20; 717/121; 710/8
(58) Field of Classification Search ................ 714/20, 714/21, 15, 38–39, 45, 3; 717/121, 124, 717/126; 710/8, 15; 711/1; 709/220, 221; 702/186
See application file for complete search history.

(56) References Cited

U.S. PATENT DOCUMENTS

| | | | |
|---|---|---|---|
| 5,894,571 A * | 4/1999 | O'Connor ...................... 713/2 |
| 5,963,743 A | 10/1999 | Amberg et al. |
| 6,223,272 B1 | 4/2001 | Coehlo et al. |
| 6,543,047 B1 * | 4/2003 | Vrhel et al. .................. 717/121 |
| 6,691,253 B1 * | 2/2004 | Gillenwater et al. .......... 714/36 |
| 6,714,937 B1 * | 3/2004 | Eynon et al. ................ 707/102 |
| 6,760,708 B1 * | 7/2004 | Hubbard et al. .............. 705/27 |
| 6,775,829 B1 * | 8/2004 | Kroening ..................... 717/175 |
| 6,813,531 B2 * | 11/2004 | Coale et al. .................. 700/97 |

FOREIGN PATENT DOCUMENTS

| GB | 2203869 | 10/1988 |
|---|---|---|
| GB | 2353373 | 2/2001 |

OTHER PUBLICATIONS

International search report application No. GB0121586.2 mailed Apr. 29, 2003.

* cited by examiner

*Primary Examiner*—Dieu-Minh Le
(74) *Attorney, Agent, or Firm*—Meyertons Hood Kivlin Kowert & Goetzel, P.C.; B. Noël Kivlin

(57) ABSTRACT

A method is provided for checking a computer system configuration in which a first check file is provided (28). A second check file is compiled (34) from the computer system configuration. The first and second check files are compared against each other (36) and a computer system configuration is approved (38) in dependence on the result of this comparison. This process can take place at the point of manufacture or at a customer installation or both.

14 Claims, 3 Drawing Sheets

METHOD FOR CHECKING A COMPUTER SYSTEM CONFIGURATION

FIELD OF THE INVENTION

This invention relates to a method for checking a computer system configuration, and in particular for verifying either a software configuration, or a firmware configuration, or a hardware configuration, or any combination of these.

BACKGROUND TO THE INVENTION

Computer systems of all types have increased greatly in complexity in recent years. One result of this increase in complexity is the tailoring of hardware, software and firmware configurations of computers to particular end users. This now happens with all types of computer including PCs and servers.

When a user orders a computer a particular configuration is specified. This will comprise a hardware configuration, firmware in which reside many of the basic routines required to make the hardware run, and a software configuration or a software stack which includes all the software the user specifies including the particular operating system he wishes to use, any optional modules to that operating system to give particular types of enhanced functionality and usually a number of application programmes which run within the operating system.

The hardware configuration comprises a number of components, some of which have optional settings which are set at the factory when the computer is manufactured to conform with a particular user's requirement.

The firmware comprises a number of components, mostly memory units of the read only type pre-loaded with software to run various routines operations on the hardware configuration, in dependence on the hardware configuration selected. The software configuration usually includes an operating system for the hardware and a number of application programmes. These are contained as a software stack which usually resides on a hard disc in the computer system. These programmes are stored in files on the hard disc or other storage medium.

At present, there are no tools available for checking at the point of manufacture whether or not a hardware, firmware, or software configuration has been correctly installed to fulfil a customer's requirements. With the fast rate of development of computer technology this can lead to installation errors in the configurations for example incompatibility between a software file and the latest version of a particular version of hardware. If these are not picked up at manufacture, they do not become apparent until a computer system is installed at its end destination and use of it is commenced. Even then, some parts of the configuration are not accessed particularly frequently and it therefore may be some time before the error is detected.

SUMMARY OF THE INVENTION

Data for checking that a hardware configuration is correctly installed usually comprises a data file or set of data files including data identifying the particular pieces of hardware which should be installed in a configuration and any factory settings which should be applied to the hardware.

Software and firmware can include relatively large files storing routines and applications to be executed on the computer system. Providing a corresponding file against which to check a particular configuration would require a large amount of storage and, furthermore, a significant amount of time to compare all the files installed in the configuration against a baseline configuration.

Accordingly, Sun Microsystems has developed a tool known as a fingerprint database which is publically available and contains checking data including checksums for all files available in Sun packages. A checksum is a value derived using digital logic from the data stored in a file. Checksums have been well known for many years as a way of verifying digital data. The size of a checksum need bear no relation to the size of the data file from which it is derived. In their simplest forms, checksums are single bits added to the ends of data words. In more sophisticated forms, they will comprise a plurality of bits or words added to data. The use of checksums to verify the integrity of a data file requires relatively little storage compared to the size of the file. What is required is a microprocessor or some form of digital logic to perform the checksum calculation on the file being checked to determine a checksum or comparison with a known checksum for that file. Many computer systems are capable of running this type of checking operation on their own configurations.

To date, the fingerprint database including all the checksums for Sun Microsystems Inc has not been used in manufacture.

In a specific embodiment of the present invention, a check file is derived for each computer system configuration to be produced. The check file is then used to check the configuration of the computer system to which it relates at the point of manufacture. The check file can also be supplied to a customer and when a computer system is installed at a customer's site, the check file can be compared against a check file derived from the computer system configuration to determine whether or not there are any inaccuracies in the configuration.

The check file can be used to check hardware configuration, firmware configuration, or software configuration or any combination of these.

The check file is originally generated when the computer system configuration is defined. It is derived directly from the configuration. If a fingerprint database is available containing checksums for all files available, this can be accessed to construct the check file. If such a database is not available then checksums from data files can be derived using digital logic, and predetermined checksum routines.

At manufacture, embodiments of this invention enable a variety of computer system configurations to be checked simultaneously whilst they are still in the factory. This can be the checking of a plurality of identical configurations or of different configurations. A copy of the check file for each configuration can also be supplied with each computer system delivered to each end user and a further verification of the integrity of the configuration performed either by the end user or by an installation engineer before the system comes into operation.

Computer systems can be arranged to check their own configurations using the check file, or, alternatively, a further computer system can be used to Compare the configuration of the computer system against the check file.

BRIEF DESCRIPTION OF THE DRAWINGS

Specific embodiments of the invention will now be described in detail by way of example with reference to the accompanying drawings in which.

DETAILED DESCRIPTION OF PREFERRED EMBODIMENTS

Figure 1:
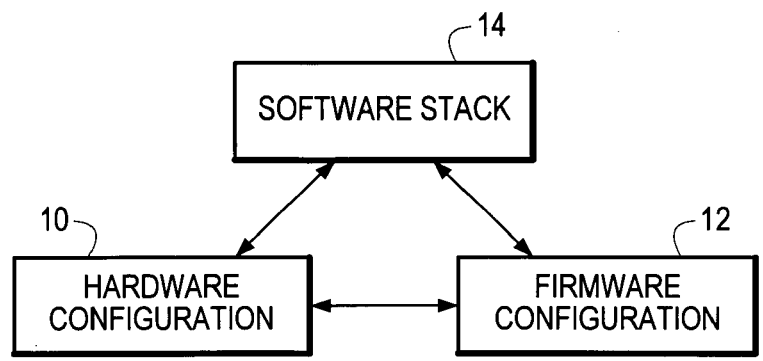
FIG. 1 shows schematically the relationships between hardware, firmware, and software in a computer configuration.

In FIG. 1, a computer configuration is shown. This comprises a hardware configuration 10, a firmware configuration 12 and a software stack 14. Each of these three portions of the configuration are in communication with each other. As described above, the hardware configuration comprises all the hardware elements required to meet a particular customer requirement, the firmware configuration comprises the routines required to make the particular hardware configuration run, and is normally stored in some form of read-only memory. The software stack comprises a set of files which will typically include an operating system and a set of application programmes which are required by the customer to run on the hardware.

Figure 2:
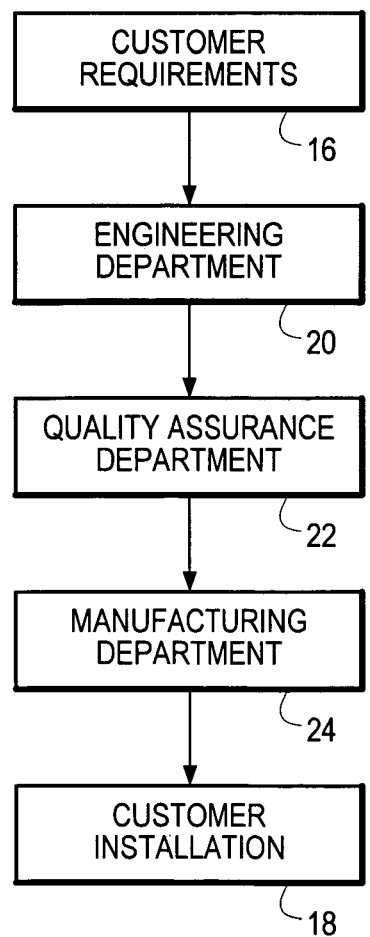
FIG. 2 shows schematically the production of a particular configuration from the customer requirements stage through to a customer installation being in place.

FIG. 2 illustrates the flow from a customer's requirements being specified at 16 through to the customer installation at 18. Customer requirements are firstly provided to an engineering department at a manufacturer which designs a hardware, firmware, and software configuration at 20 to meet the particular customer requirements. At the same time, a check file is generated which includes listings of all the hardware items considered appropriate, the firmware requirements, including pre-loaded routines, and data derived from the files comprising the software stack 14. The hardware listings include part numbers and details of optional settings to the hardware. The firmware listing also include part numbers, but also include checksum data derived from routines stored in firmware. The data derived from the software stack includes checksum data. This is data derived logically from the bits comprising the file using known techniques. The checksum data for a file will require a much smaller amount of storage than the file itself. Checksum data can also be derived from the routine stored in firmware.

At Sun Microsystems, a fingerprint database is available which stores checksum files for every application programme or software routine produced by Sun Microsystems. Usually, the engineering department will access this database to compile the check file using the checksums for each file in the software stack or routine stored in firmware.

The process then passes to a quality assurance department 22 which compiles a check file from the configuration supplied. It does this by checking the hardware present and any particular settings of this hardware, checking the firmware installed and deriving checksum data from routines stored in firmware, and deriving checksum data from the files in the software stack. The checksum data is derived from first principles using the same routines as should have been used at the engineering stage 20.

Once the configuration has been approved by the quality assurance department 22 it passes to the manufacturing department 24 which builds the particular configuration. After building the configuration it also generates a check file from first principles using the same checksum logic as used by the engineering department and quality assurance department. This check file is compared against the original check file and if it corresponds the computer is released to a customer.

At a customer installation 18, a check file is generated again from first principles using the same checksum logic as used in the earlier stages and if the check file generated corresponds to that from the earlier stages, the installation is approved.

Figure 3:
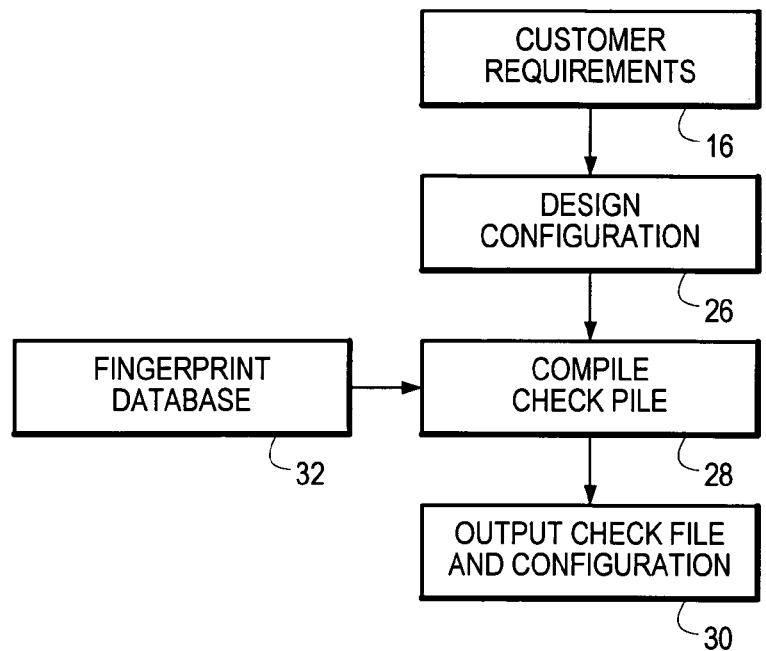
FIG. 3 shows how at the engineering stage a check file is produced in an embodiment of the invention.
Figure 4:
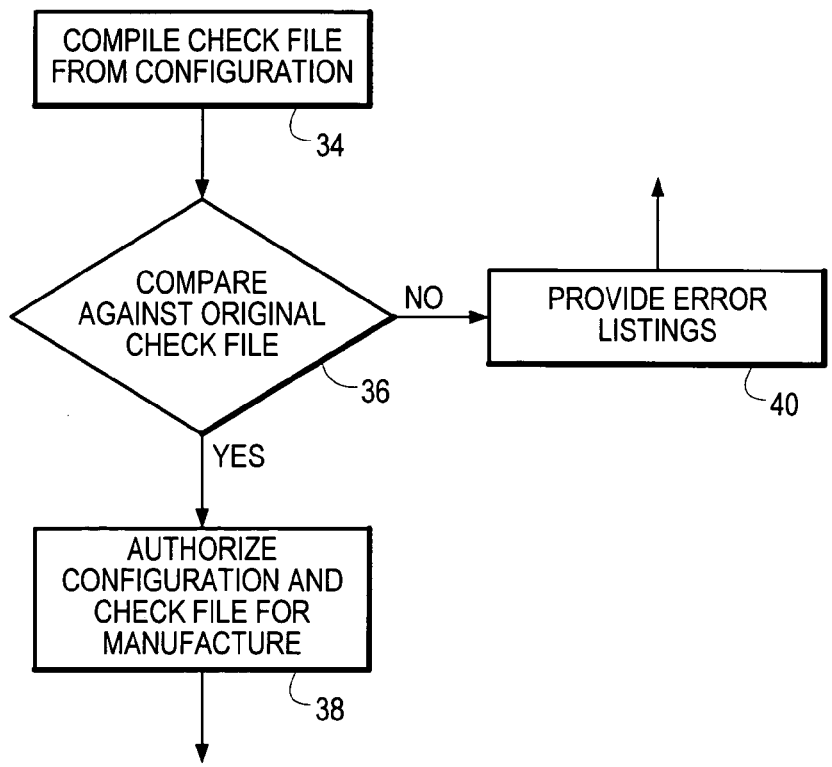
FIG. 4 shows the quality assurance processes applied to the check file and configuration generated in FIG. 3 in an embodiment of the invention.

The process shown at 20 in FIG. 2 is illustrated in more detail in FIG. 3. In this, a customer's requirement 16 are received and a configuration to meet these requirements is designed at 26. A check file is then compiled at 28. This is derived from the hardware specified by the configuration and its settings, the firmware specified and the software stack specified. Routines stored in firmware will have checksum data in the check file and each file in the software stack will also have checksum data for it stored in the check file. The checksum data in an organisation such as Sun Microsystems is read directly to the check file from a fingerprint database which stores checksum data for all files available within Sun Microsystems. Once the check file has been compiled at 28, it and the configuration are output at 30 and can be supplied to the quality assurance department 22.

At the quality assurance department, a new check file is derived from the configuration specified. This check file comprises the data relating to the hardware configuration and settings applied thereto, data relating to the firmware, including checksum data for routines stored therein, and checksum data derived from the software stack. Checksum data is derived from first principles from the configuration using the same checksum routines as were originally used to derive the checksum data stored in the fingerprint database 32. This takes place at step 34.

Once the new check file has been compiled, it is compared against the original check file compiled by the engineering department at 36. If the check files passes the comparison test then the configuration and check file are authorised for manufacture at 38 and are released to the manufacturing department.

If the comparison test is not passed, a listing of errors is provided at 40 and these are returned to the engineering department at 20 to check the configuration against that specified and to ensure that the errors detected are corrected either by respecifying the configuration or by correcting the check file.

Figure 5:
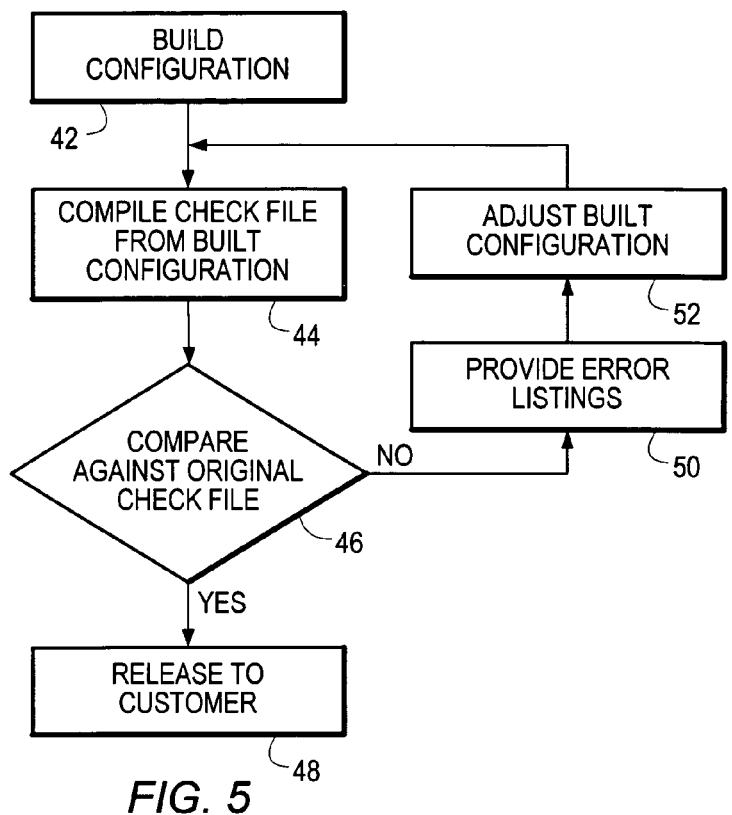
FIG. 5 shows the manufacturing checking processes applied using the check file generated in FIG. 3.

The manufacturing process is shown in FIG. 5, and in this, the configuration specified is built at 42. At 44, a check file is derived from the built configuration using first principles by examining the hardware in the configuration and the settings applied thereto, examining the firmware and the routines stored therein, and by examining the files stored in the software stack. Checksum data is derived from the routines stored in firmware and from the files in the software stack.

The check file is compiled using an external computer which runs the routines required to generate the check file from the configuration that has been built. Alternatively the check file can be generated directly by the computer system that has been built using a software diagnostic that runs the routines to generate the check file.

The newly derived check file is then compared against the original check file provided by the engineering department at 46. If for a particular built machine the comparison is passed then the machine and the check file are released to a customer at 48. If the comparison is failed then error listings are provided at 50 and the built configuration is checked and adjusted at 52. Flow then passes again to the compilation of a check file from the adjusted configuration at 44 and further comparison against the original check file at 46.

At a customer site, the built configuration is installed 54. A check file is then generated from the installed configuration at 56 using the same methods as used at manufacture. This is done using software provided with the check file which includes software to run the checksum logic required to derive the checksum data stored for the firmware routines and for the files in the software stack. This can be provided as an internal diagnostic tool or can be run from an external machine.

A newly compiled check file is then compared and run against the original check file at 58. If the comparison is passed then the installation is approved at 60. If it is failed, then error listings are provided at 62 and the supplier advised at 64 so that remedial action can be taken for the particular configuration.

The check file described above, can be used only to check hardware, or only to check firmware, or only to check the software stack, at any stage in the process. Alternatively, any combination of these three could be checked at any stage.

The checksum data used with the software stack is particularly important since software is frequently updated. Thus, the software installed at the manufacturing stage may not be the same software as was originally specified by the engineering department and on which the configuration is based.

The checksum data for each file will include:
file name
checksum
file size
time of last modification
file type.
Other information can also be included.

Figure 6:
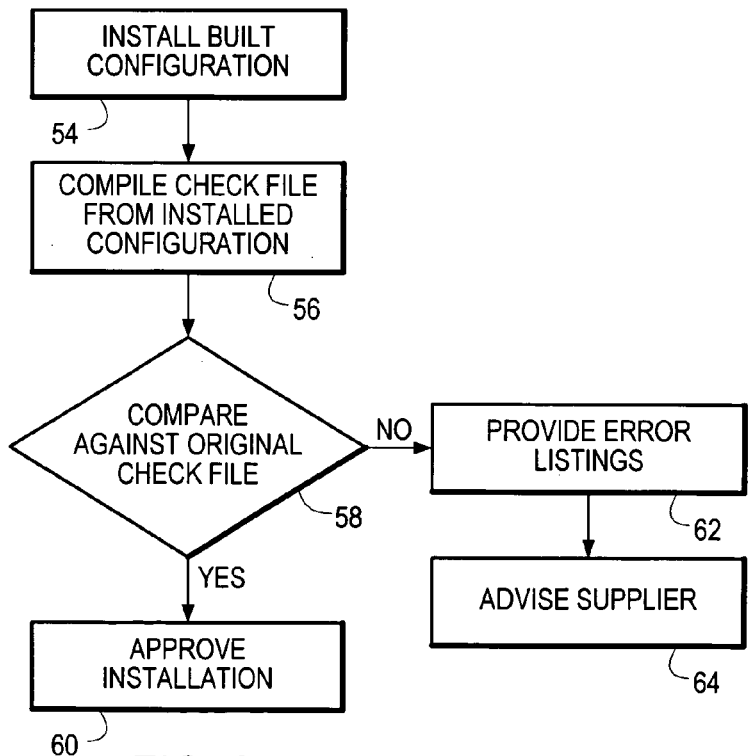
FIG. 6 shows the checking processes performed at a customer installation.

At the manufacturing stage, where a plurality of similar installations are being built, statistical analysis on errors can identify systematic problems in the manufacturing process. Thus, it will soon become apparent if software has changed since the check file being used was first generated. Changes in firmware and hardware can happen at any time and these also can be identified by statistical analysis of errors in the comparison stage. In instances where a customer is installing equipment itself, the comparisons shown in FIG. 6 are run and a list of hardware, firmware and software configurations produced to send back to the manufacturer for checking.

Furthermore, a customer is able to check software updates against the original check file provided with the installed system to determine exactly what parts of the installed system have been changed by updates. This is useful in analysing problems at an installation.

Although method and systems consistent with the present invention have been described with reference to the embodiment above, those skilled in the art will know of various changes in form and detail which may be made without departing from the present invention as defined in the appended claims and their full scope of equivalence.

What is claiemd is:

1. A method for checking a computer system configuration comprising the steps of:

specifying a set of customer's requirements for a computer system configuration;
designing a computer system configuration meeting the specified requirements, wherein the designed computer system configuration comprises a hardware portion and a software portion;
generating a first check file, wherein the first check file comprises data identifying the hardware portion and the software portion of the designed computer system configuration;
building the designed computer system configuration;
deriving a second check file from the built computer system configuration, wherein the second check file comprises data identifying a hardware portion and a software portion of the built computer system configuration;
comparing the first and second check files to determine whether the hardware portion of the designed system configuration matches the hardware portion of the built computer system configuration and whether the software portion of the designed system configuration matches the software portion of the built computer system configuration; and
approving the built computer system configuration in dependence on the results of the comparison.

2. A method according to claim 1 in which the first check file includes data relating to a firmware portion of the designed computer system configuration.

3. A method according to claim 1 in which the step of generating the first check file comprises the step of generating checksum data from said software portion.

4. A method according to claim 3 in which the step of generating checksum data comprises the step of deriving checksum data for each file in said software portion.

5. A method according to claim 1 in which the second check file includes data relating to a firmware portion of the built computer system configuration.

6. A method according to claim 1 in which the step of generating the second check file comprises the step of generating checksum data from said software portion.

7. A method according to claim 6 in which the step of generating checksum data comprises the step of deriving checksum data for each file in said software portion.

8. A method for checking a computer system configuration comprising the steps of:

specifying a set of customer's requirements for a computer system configuration;
designing a computer system configuration meeting the specified requirements, wherein the designed computer system configuration comprises a hardware portion and a software portion;
generating a first check file, wherein the first check file comprises data identifying the hardware portion and the software portion of the designed computer system configuration;
building and installing the designed computer system configuration;
deriving a second check file from the installed computer system configuration, wherein the second check file comprises data identifying a hardware portion and a software portion of the installed computer system configuration;
comparing the first and second check files to determine whether the hardware portion of the designed system configuration matches the hardware portion of the installed computer system configuration and whether the software portion of the designed system configuration matches the software portion of the installed computer system configuration; and approving the installed computer system configuration in dependence on the results of the comparison.

9. A method according to claim 8 in which the first check file includes data relating to a firmware portion of the designed computer system configuration.

10. A method according to claim 8 in which the step of generating the first check file comprises the step of generating checksum data from said software portion.

11. A method according to claim 10 in which the step of generating checksum data comprises the step of deriving checksum data for each file in said software portion.

12. A method according to claim 8 in which the second check file includes data relating to a firmware portion of the installed computer system configuration.

13. A method according to claim 8 in which the step of generating the second check file comprises the step of generating checksum data from said software portion.

14. A method according to claim 13 in which the step of generating checksum data comprises the step of deriving checksum data for each file in said software portion.

* * * * *